No. 659,381. Patented Oct. 9, 1900.
W. H. SMYTH.
SOLDERING MACHINE.
(Application filed Dec. 30, 1899.)
(No Model.) 2 Sheets—Sheet 1.
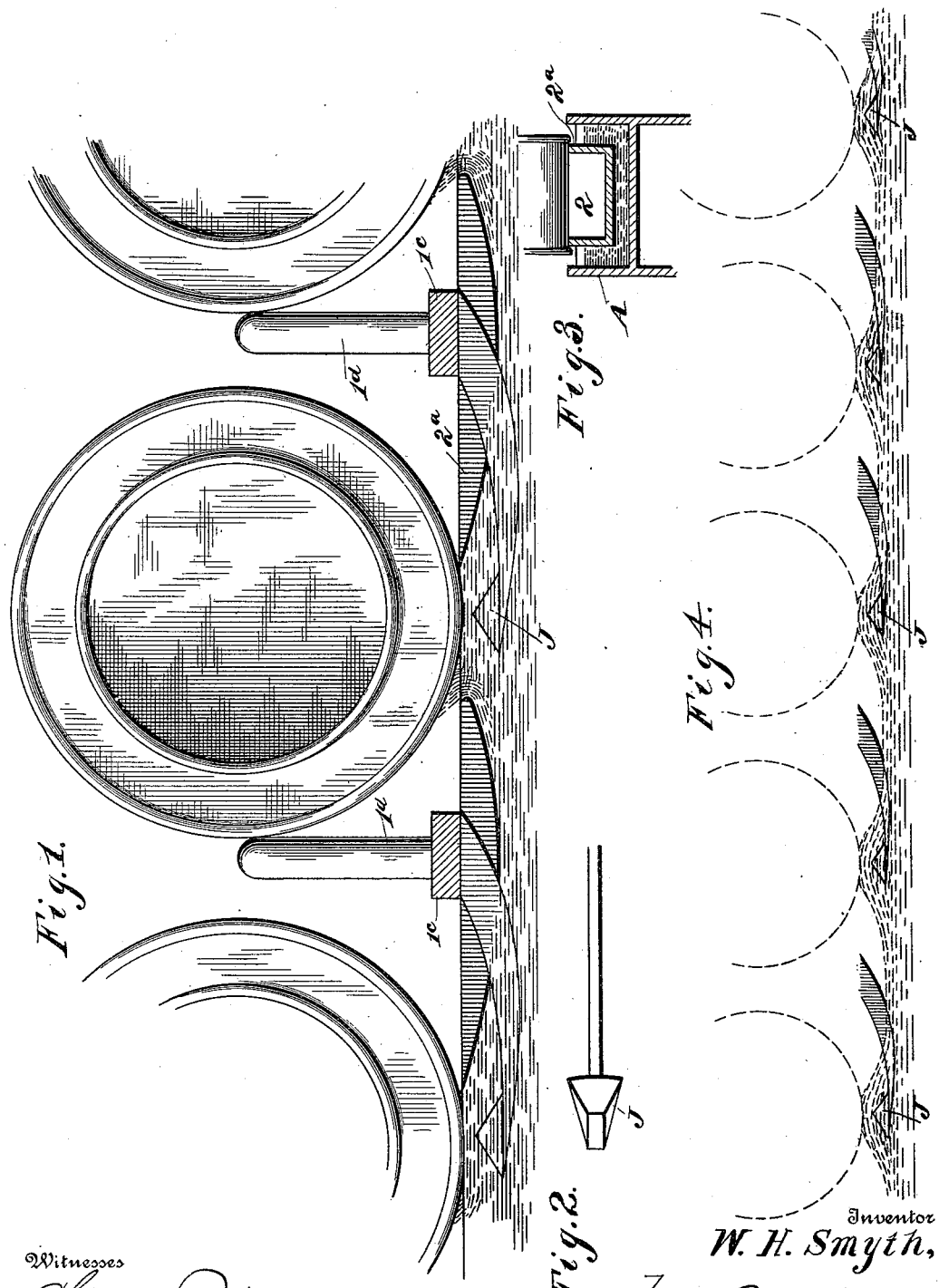
Witnesses
Chas. W. Parker
D. C. Dennison.
Inventor
W. H. Smyth,
by L. S. Bacon
Attorneys No. 659,381.  
W. H. SMYTH.  
SOLDERING MACHINE.  
(Application filed Dec. 30, 1899.)  
Patented Oct. 9, 1900.
(No Model.)  
2 Sheets—Sheet 2.
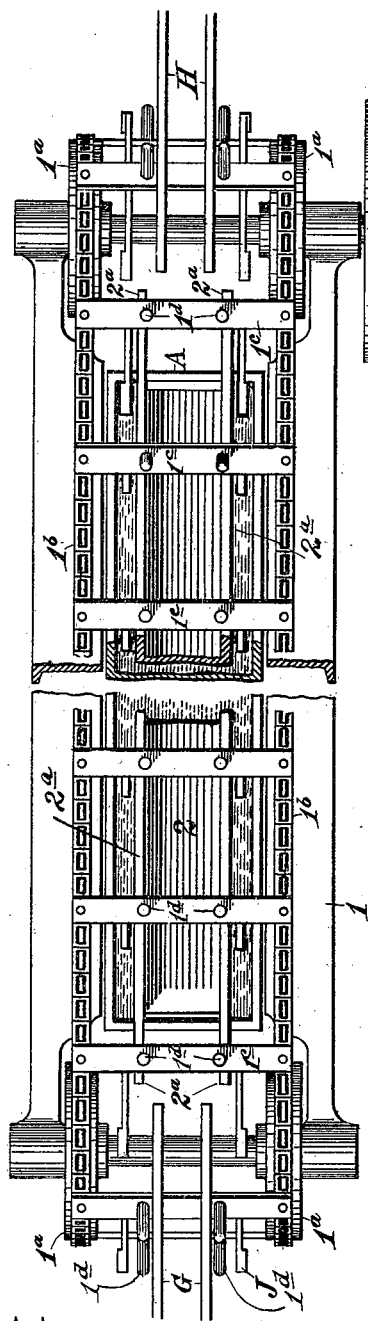
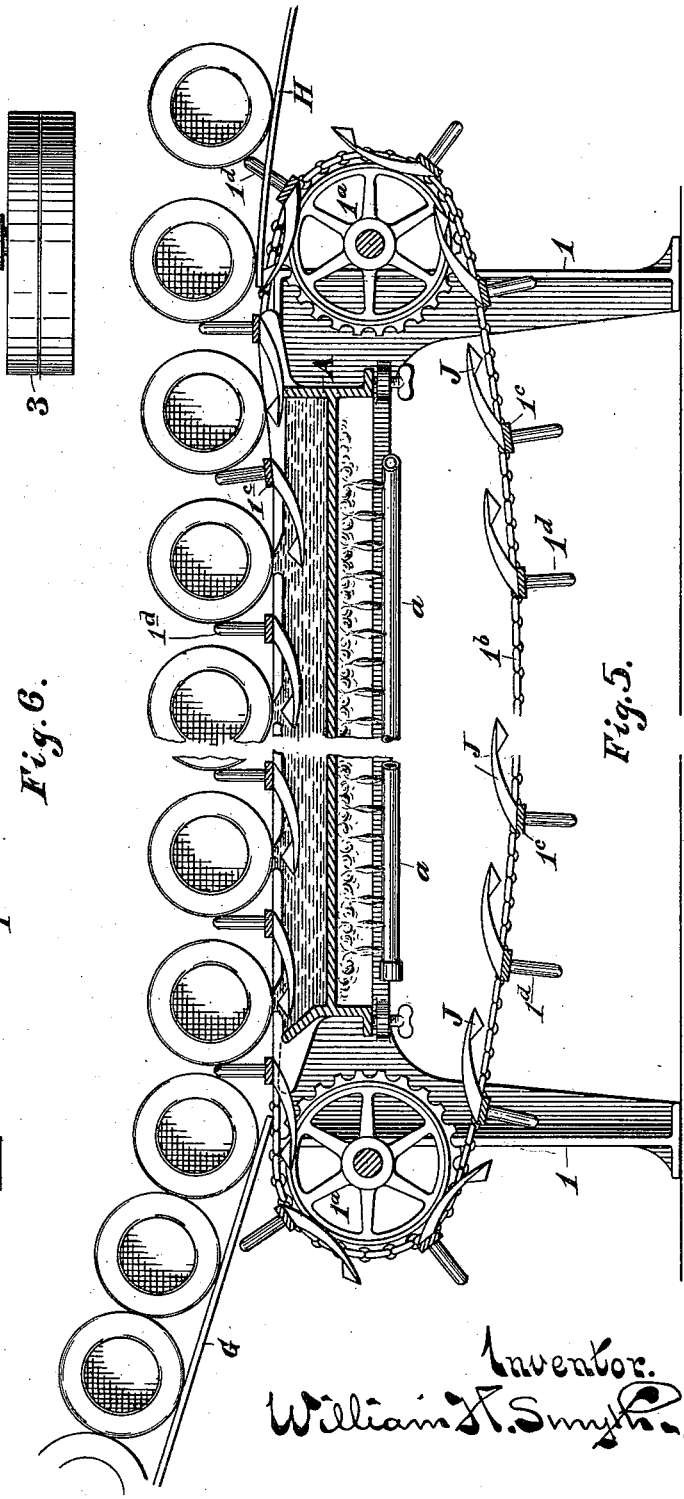
Witnesses:  
Mason S Norton  
Jesse R. Eoff
Inventor.  
William H. Smyth

UNITED STATES PATENT OFFICE.

WILLIAM H. SMYTH, OF BERKELEY, CALIFORNIA.

SOLDERING-MACHINE.

SPECIFICATION forming part of Letters Patent No. 659,381, dated October 9, 1900.

Application filed December 30, 1899. Serial No. 742,075. (No model.)

*To all whom it may concern:*

Be it known that I, WILLIAM H. SMYTH, mechanical engineer, a citizen of the United States, residing at Berkeley, in the county of Alameda and State of California, have invented certain new and useful Improvements in Soldering-Machines; and I do hereby declare the following to be a full, clear, and exact description of the same.

This invention relates to the class of machines for applying fluid metal to objects.

In the form herein illustrated it is particularly adapted to applying solder to the joints of sealed goods-receptacles, and more particularly to the top and bottom cover-joints of cans of cylindrical form.

The object of the invention is to provide more rapid, efficient, and economical means of applying fluid metals, and in the form herein illustrated it is to provide a simple and efficient soldering-machine adapted to solder large quantities of cans rapidly and apply a minimum amount of solder thereto.

It consists in the novel constructions and combinations hereinafter described and claimed.

Referring to the drawings, Figure 1 is an elevation of one form of wave-former in position applying solder to the head-seam of a can. Fig. 2 is a detail of one form of wave-former. Fig. 3 is a section of a solder-receptacle with the cover thereto. Fig. 4 indicates the changing superficial contour of fluid solder produced by the travel of the submerged wave-formers. Fig. 5 is a sectional elevation of a machine, showing traveling wave-formers attached to endless traveling chains. Fig. 6 is a plan view of a machine using a bath of molten solder and wave-formers whereby portions of the solder-surface are applied to the top and bottom cover-joints of cans.

1 is a frame supporting a solder-receptacle A, provided with a suitable heating device $a$. Journaled in bearings on each end of frame 1 is a pair of sprocket-wheels $1^a$. An endless sprocket-chain $1^b$ connects each side pair of sprocket-wheels. These two chains are connected at intervals by bars $1^c$. From one side of each of these bars $1^c$ project can spacing and driving pins $1^d$, and to the other side of each of the bars is secured wave-formers J J. For the purpose of this illustration the wave-formers J J are formed in the shape of flat tapering sharp-edged wedges. They may, however, be almost endlessly modified to conform them to the particular character of work to be done. A cover 2 is provided for the solder-receptacle depending therein, whereby a portion of the solder is displaced and the bath of solder in section becomes U-shaped, (see Fig. 3,) the arms of the U forming long narrow parallel baths connected by a large body of fluid solder below. The upward-projecting sides of the cover form convenient tracks $2^a$, upon which the cans may roll.

A feed-chute G is provided in line with the tracks $2^a$ and forms a continuation of them. There is also provided a discharge-chute H in line with the tracks $2^a$, forming an opposite continuation.

A belt-pulley 3 for driving the chain $1^b$ is secured upon one of the sprocket-wheel shafts.

In the operation the traveling motion of the chains carries the cans, suitably fed thereto, across the length of the solder-bath, above which they are supported by the tracks $2^a$. The wave-formers J J in the solder-bath each cause a wave of solder in contact with a cover-joint of the traveling can, and by the rotation of the rolling can all parts of each circumferential joint are brought in contact with the solder-wave, and thus soldered. The width of each wave, and consequently the width of the band of solder applied, is dependent upon the width of the wave-former, which may range from the thickness of a line to any width. The cans having rolled across the bath are discharged by the driving-pins $1^d$ into the discharge-chute H.

In the device herein shown and described the object soldered travels at the same speed as the wave, though this is not essential, and I do not wish to limit my invention to such a construction, inasmuch as the action of the wave-former is the same whether the object travels at the same speed as the wave-former or not.

Having thus disclosed this invention and described and shown characteristic forms in which it may be carried into effect, I claim—

1. A machine comprising an endless chain, a fluid-receptacle located intermediate of its folds, and a wave-former operated by said chain.

2. A machine comprising an endless traveling chain, a fluid-receptacle located intermediate of its folds, and a device carried by said chain and adapted to form a wave in the fluid in the receptacle.

3. A machine comprising an endless traveling chain, a fluid-receptacle located intermediate of its folds with supporting-pulleys at each end bight of the chain, and a device carried by said chain and adapted to form a wave in the fluid in the receptacle.

4. A machine comprising an endless traveling chain and a fluid-receptacle located intermediate of its folds, said chain provided with depending projections adapted to enter said receptacle whereby the fluid is applied to objects above the normal surface.

5. A machine comprising an endless traveling chain supported upon pulleys at each end bight thereof, a fluid-receptacle intermediate of its folds projections upon the outer surface of said chain adapted to move objects above the surface of the fluid-receptacle and projections upon the inner surface of said chain adapted to enter said fluid-receptacle whereby fluid is applied to said objects.

6. A machine comprising an endless traveling chain supported upon pulleys at each end bight thereof, a fluid-receptacle intermediate of its folds, projections upon the outer surface of said chain adapted to move objects above the surface of the fluid-receptacle and projections upon the inner surface of said chain adapted to enter said fluid-receptacle whereby fluid is applied to said objects and means for heating said fluid.

7. A machine comprising a multiplicity of endless traveling chains, each chain provided at its end bight with a supporting-pulley and joined by transverse connecting-pieces, a fluid-receptacle located between the folds of the compound chain, devices attached to the connecting-pieces adapted to enter said receptacle whereby fluid is applied to objects above said receptacle.

8. A machine comprising a fluid-receptacle, means for heating the same, an endless-chain carrier adapted to travel around said receptacle in a vertical plane provided with projecting devices adapted to enter said receptacle whereby fluid therein is applied to objects above the surface of said fluid.

9. A machine comprising a fluid-receptacle provided with a cover thereto providing longitudinal openings and means for heating said receptacle, an endless-traveling-chain carrier adapted to travel around said receptacle in a vertical plane, provided with projecting devices adapted to enter said receptacle whereby fluid therein is applied to objects above the surface of said fluid.

10. A machine comprising the receptacle A with its heating device, the compound chain $1^b$ with its projections J adapted to travel in said receptacle and arranged and operating substantially as described.

11. A solder-bath, a cover thereto and means traveling longitudinally of the bath and adapted to apply solder from the bath to a can above the cover.

12. A solder-bath, a cover thereto having tracks to support a rolling can and traveling means adapted to apply solder from the bath to the can while the latter rolls longitudinally of the solder-bath.

13. A solder-bath, a cover thereto having tracks to support a rolling can, feed and discharge chutes forming opposite continuations of said tracks and traveling means adapted to apply solder from the bath to a can, while the latter rolls on the tracks longitudinally of the solder-bath.

14. A solder-receptacle and a cover depending therein of substantially the same shape in cross-section but smaller width, whereby a portion of the solder in the receptacle is displaced and formed into a plurality of long parallel solder-baths.

15. A solder-receptacle having a cover depending therein of a less width than the receptacle, the long sides of said cover forming tracks for rolling cans above the surface of the solder in the receptacle.

16. A long solder-receptacle having a cover depending therein of less width than the receptacle and spaced from each side thereof whereby the solder in the receptacle is formed into substantially U-shaped section.

17. The combination of a solder-bath, a cover therefor constituting a support for a rolling can, and means traveling longitudinally of the bath for applying solder from the bath to the can while rolling.

18. A solder-bath, a cover thereto and non-rotative means adapted to apply solder from the bath to a can above the cover.

19. A solder-bath, a cover thereto having tracks to support a rolling can and non-rotative means adapted to apply solder to the can while rolling.

20. A solder-bath, a cover thereto having tracks to support a rolling can, feed and discharge chutes forming opposite continuations of said tracks and non-rotative means adapted to apply solder from the bath to a can, rolling on the tracks.

WILLIAM H. SMYTH.

Witnesses:
JESSE R. EOFF,
H. P. SMYTH.